April 14, 1936.  L. A. SAFFORD  2,037,151
MULTICHAMBERED RESERVOIR
Filed Feb. 15, 1934
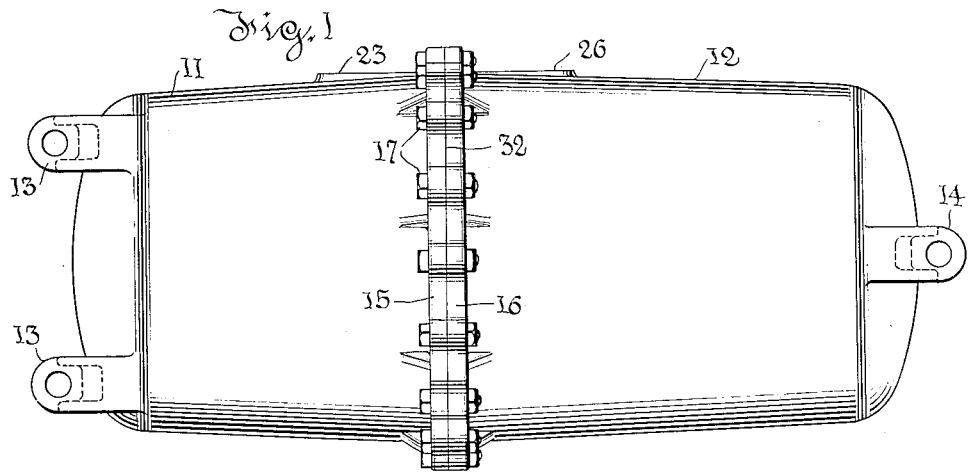
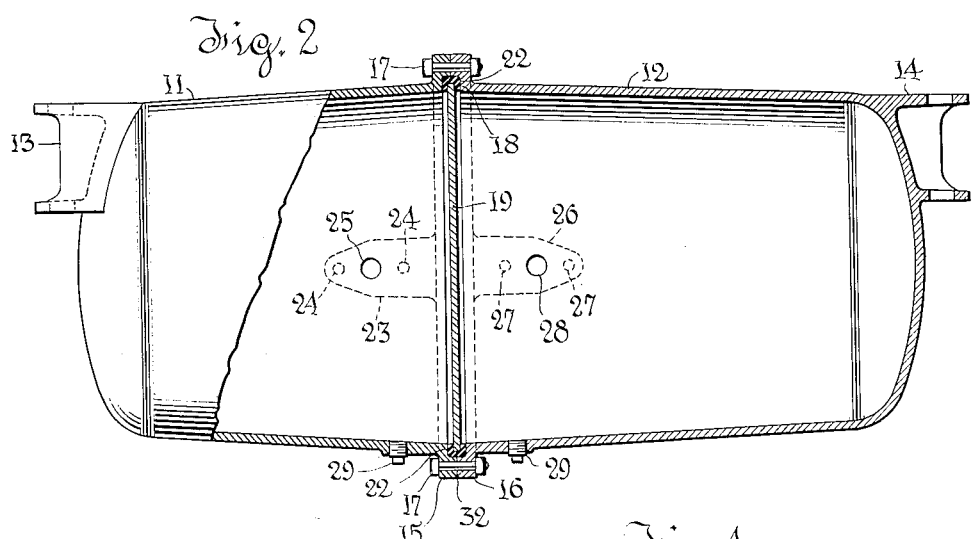
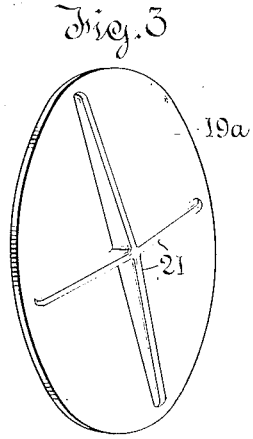
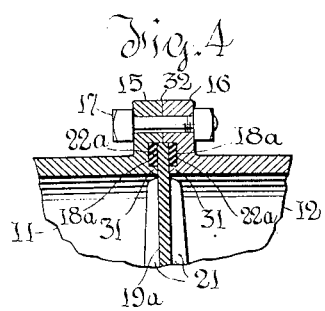
Inventor
Lewis A. Safford
By
Dodge and Sons
Attorneys Patented Apr. 14, 1936

2,037,151

UNITED STATES PATENT OFFICE 2,037,151

MULTICHAMBERED RESERVOIR

Lewis A. Safford, Watertown, N. Y., assignor to The New York Air Brake Company, a corporation of New Jersey Application February 15, 1934, Serial No. 711,446

5 Claims. (Cl. 220—22)

This invention relates to metallic receptacles, and particularly to reservoirs for use with fluid pressure brakes such as automatic air brakes.

In the air brake art it is standard practice to use cast iron reservoirs on the cars. For example, in the freight brake making use of the K-type triple valve, which was standard until very recently, a single reservoir is used on each car. This reservoir is cast in one piece about a dry sand core and is formed with a ported seat on its rear end to receive the body of the triple valve, and with a seat on its forward end to receive the brake cylinder.

Such cast iron reservoirs have given highly satisfactory service and are preferred by the railroads for a number of reasons. The fluid pressures used are well within limits which may be resisted by the tensile strength of cast iron. Cast iron is relatively free from corrosion and consequently cast iron reservoirs do not require the periodic hammer tests which are prescribed for wrought metal pressure vessels in railroad service.

There has recently been adopted as standard by the American Railroad Association, a new type of brake valve, known as the AB brake valve, and this brake valve is characterized by the use of two reservoirs, one known as the auxiliary reservoir and the other known as the supplemental or emergency reservoir. Both reservoirs are charged through the brake valve while the brakes are released. The auxiliary reservoir is used as a source of compressed air for all service applications, and both reservoirs are used conjointly as a source of compressed air for emergency applications. The desired braking characteristics are such that the two reservoirs are of different volumes.

The principal object of the present invention is to provide a form of cast metal reservoir having two chambers isolated from each other, the reservoir being made up of three components capable of being cast in green sand molds produced on molding machines. These main components comprise two cup-shaped end sections and an intervening separator section. The design is such that the use of dry sand cores is reduced to the minimum or completely avoided. In this way there is produced a very simple form of two-chamber reservoir which is inexpensive to manufacture, and which may be more easily cleaned of adhering sand than could the cored reservoirs heretofore used.

Preferred embodiments of the invention are illustrated in the accompanying drawing, in which,—

Fig. 1 is a plan view of a complete reservoir embodying the invention.

Fig. 2 is a view chiefly in vertical axial section through the reservoir shown in Fig. 1.

Fig. 3 is a perspective view of a modified form of separator plate used to subdivide the reservoir shell into two reservoir volumes.

Fig. 4 is a fragmentary view on an enlarged scale showing a modified form of packing used to seal the separator plate.

Referring first to Figs. 1 and 2, the reservoir is made of two cup-shaped elements 11 and 12. These are slightly tapered externally and internally so that in effect they are frustra of cones. The closed end of each shell is rounded, the form being favorable to the relief of shrinkage strains in the casting.

On the end of the section 11, and near the upper side thereof, are two attaching lugs 13, whose form is clearly shown in the drawing. These lugs are provided with bolt holes which may be formed in any usual way. On the end of the section 12, and near the upper side thereof, is a single attaching lug 14, also provided with a bolt hole. The use of two attaching lugs on one section and one on the other, offers a three-point suspension for the reservoir as a whole. This has the effect of relieving the reservoir of torsional stresses, but so far as the invention is concerned, it is not essential that there be a total of three lugs, nor is it material which section carries the two lugs.

The draft of the patterns for the castings is such as to permit removal from the mold in the direction of the axes of the conical walls, and the attaching lugs 13 and 14 are given such draft as to permit withdrawal of the patterns in this direction.

The meeting ends of the sections 11 and 12 are respectively provided with mating flanges 15 and 16 which are connected together by bolts 17. The faces of the flanges are counterbored as indicated at 18 to offer an annular recess in which the periphery of the separator plate or disk 19 is received. This disk 19, as indicated in Fig. 2, is circular and might be a steel plate.

It may, however, be formed of cast iron, but if formed of cast iron it is considered usually advisable to construct it as shown in Fig. 3 in which a cast iron disk or plate 19a is indicated. This disk is cast with integral ribs 21 preferably on both faces of the disk. In Fig. 3 only one face is visible so only one set of ribs appears, but it will readily be understood that the opposite side of the disk is similarly provided with ribs.

In order to seal the periphery of the disk 19 or 19a in the counterbored recess 18, use is made of an encircling gasket 22, U-shaped in cross section, and snapped over the rim of the disk. The gasket 22 may be formed of any suitable material, but is preferably of a special rubber compound extensively used for gaskets in the air brake art.

The section 11 is provided with a pad or boss 23 intended to receive a pipe connection leading to an automatic brake valve, for example, a triple valve. This pipe connection is not illustrated, but includes a flange member connected to the pad 23 by machine screws or studs, which are threaded into the tapped holes 24. The flange fitting has an orifice which registers with the orifice 25 leading to the interior of the reservoir.

The section 12 is similarly provided with a pad 26 having tapped holes 27 and an orifice 28, corresponding to the parts 23, 24 and 25, already described.

Drain plugs are indicated at 29.

In the construction shown in Fig. 2, the separator plate 19 or 19a, whichever is used, floats in the gasket 22, that is to say, the plate does not enter into metal-to-metal contact with either of the flanges 15 or 16, but is held closely by the compression of the gasket 22. If it is deemed desirable to position the plate 19, or 19a, rigidly by metal-to-metal contact with the flanges 15 and 16, the construction adopted in Fig. 4 may be used. Here the gasket grooves 18a are spaced from the inner periphery of the flanges, leaving a rib 31 which engages the separator plate 19, or 19a, and closely confines the same. Furthermore the rib 31 confines the inner periphery of the gasket 22a, as clearly shown in Fig. 4. In this figure the opportunity has been taken to show the use of two separate gaskets 22a instead of the single U-shaped gasket 22 shown in Fig. 2, but obviously a single gasket U-shaped in cross section, identical with the gasket 22 of Fig. 2, might be used in the structure of Fig. 4 if clearance for it be afforded around the periphery of the separator plate.

The outer peripheral portions of the flanges 15 and 16 are in metal-to-metal contact, as indicated at 32, so that the reservoir structure is held rigidly in alignment and the compression imposed on the gaskets 22 or 22a, as the case may be, is limited in amount.

It will be apparent to persons skilled in the art that the molds for the castings 11 and 12 can be produced by the use of very simple molding machinery. The disk 19, if cast, can be produced by the simplest molding methods, and the same is true of the modified disk 19a.

The reservoir, constructed as above described, is provided with adequate supporting means, so designed as not to subject it to torsional stresses. Its form is well adapted to resist internal pressures, and the form of the castings is such as to permit thorough cleaning before assembly.

If a rubber or like gasket is used, it is essential that this be of a composition characterized by long life, but such compositions are available and long have been extensively used in the air brake industry.

While I prefer to locate the supporting lugs 13 and 14 in such a way as to avoid the necessity for use of dry sand cores, they may be differently located, if preferred, without departing from the spirit of the present invention. In this respect, and also in respect of the gasketed joint, considerable latitude is permissible to the designer.

What is claimed is,—

1. A multi-chambered pressure fluid reservoir, comprising in combination, two cup-shaped castings having marginal connecting flanges in contact with one another, said flanges being formed to afford a relief groove at their inner periphery; a separator plate mounted with its periphery in said groove; a gasket structure also mounted in said groove under compression and sealing said plate to both flanges, said gasket structure being spaced from the periphery of the flanges and enclosed by the flanges; and means rigidly connecting said flanges.

2. A multi-chambered pressure fluid reservoir, comprising in combination, two cup-shaped castings having marginal connecting flanges in contact with one another, said flanges being formed to afford a relief groove at their inner periphery; a separator plate mounted with its periphery in said groove; an annular resilient gasket, U-shaped in cross section, embracing the periphery of said plate; and means rigidly connecting said flanges together.

3. A multi-chambered pressure fluid reservoir, comprising in combination, two cup-shaped castings having marginal connecting flanges, each of said flanges having an annular groove; a separator plate mounted with its periphery extending between said flanges; a gasket mounted in each of said grooves in spaced relation to the periphery of the flanges to be protected by the same and sealing said plate to both flanges to isolated the two chambers formed on opposite sides of said separator plate; and means rigidly connecting said flanges.

4. A multi-chambered pressure fluid reservoir, comprising in combination, two cup-shaped castings having at their open ends, marginal mating flanges, said flanges being formed with gasket-confining grooves spaced from the periphery of the flanges; a partition plate clamped between said flanges; gasket means confined in the grooves of said flanges and sealing said plate to said flanges, said gasket means being spaced from the periphery of said flanges and shielded by the metal thereof; and means rigidly connecting said flanges.

5. A multi-chambered pressure fluid reservoir, comprising in combination, two cup-shaped castings having at their open ends, marginal mating flanges; a separator plate mounted with its periphery extending between said flanges to form two chambers; a gasket structure mounted between said plate and said flanges in spaced relation to the periphery of the flanges to be protected by the same, and sealing said plate to both of said flanges to isolate said chambers from each other; and means rigidly connecting said flanges.

LEWIS A. SAFFORD.